(12) United States Patent
Jourdas et al.

(10) Patent No.: US 11,138,474 B2
(45) Date of Patent: Oct. 5, 2021

(54) PARAMETER TRAINING METHOD FOR A CONVOLUTIONAL NEURAL NETWORK AND METHOD FOR DETECTING ITEMS OF INTEREST VISIBLE IN AN IMAGE

(71) Applicant: Idemia Identity & Security France, Courbevoie (FR)

(72) Inventors: Cécile Jourdas, Courbevoie (FR); Dora Csillag, Courbevoie (FR); Maxime Thiebaut, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 106 days.

(21) Appl. No.: 16/591,018

(22) Filed: Oct. 2, 2019

(65) Prior Publication Data

US 2020/0110970 A1    Apr. 9, 2020

(30) Foreign Application Priority Data

Oct. 3, 2018 (FR) ..................... 1859175

(51) Int. Cl.
  *G06K 9/62* (2006.01)
  *G06N 3/04* (2006.01)
  *G06N 3/08* (2006.01)

(52) U.S. Cl.
  CPC .......... *G06K 9/6263* (2013.01); *G06K 9/628* (2013.01); *G06N 3/04* (2013.01); *G06N 3/08* (2013.01)

(58) Field of Classification Search
  CPC .... G06K 9/6263; G06K 9/628; G06K 9/6271; G06K 9/00228; G06N 3/04; G06N 3/08; G06N 3/0454; G06T 2207/20081; G06T 2207/20084

USPC ......................................................... 382/157
See application file for complete search history.

(56) References Cited

PUBLICATIONS

Redmon, "Better, Faster, Stronger" arXiv Year 2016.*
Ren, "Faster R-CNN: Towards Real-Time Object Detection with Region Proposal Networks," arXiv Year 2016.*
Henschel, "Fusion of Head and Full-Body Detectors for Multi-Object Tracking", 2018 IEEE/CVF Conference on Comupter Vision and Pattern Recognition Workshops (CVPRW), 2018, pp. 1509-1518. Year 2018.*
Xing, "Multi-Object Tracking through Occlusions by Local Tracklets Filtering and Global Tracklets Association with Detection Responses", 2009 IEEE Conference on Computer Vision and Pattern Recognition, 2009, pp. 1200-1207. Year 2009.*
Wang, "Learning Optimal Parameters for Multi-target Tracking with Contextual Interactions", International Journal of Computer Vision, 2016, 122(3), pp. 484-501. Year 2106.*

(Continued)

*Primary Examiner* — Juan A Torres
(74) *Attorney, Agent, or Firm* — Womble Bond Dickinson (US) LLP

(57) ABSTRACT

A parameter training method for a convolutional neural network, CNN, for detecting items of interest visible in images by a data processor of at least one server. The method is implemented based on a plurality of training image databases. The items of interest are already annotated, the CNN being a CNN common to the plurality of training image databases and having a common core and a plurality of encoding layers, each one specific to one of the plurality of training image databases. The method is also for detecting items of interest visible in an image.

12 Claims, 4 Drawing Sheets

(56) References Cited

PUBLICATIONS

Zhang, "Joint Face Detection and Alignment using Multi-task Cascaded Convolutional Networks", IEEE Signal Processing Letters, 23(10), pp. 1499-1503. Year 2016.*

Tang, "PyramidBox: A Context-Assisted Single Shot Face Detector", Computer Vision ECCV 2018 Lecture Notes in Computer Science, pp. 812-828. Year 2018.*

Dai, "Efficient Fine-grained Classification and Part Localization Using One Compact Network", 2017 IEEE International Conference on Computer Vision Workshops (ICCVW), pp. 996-1004. Year 2017.*

International Search Report and Written Opinion of the French National Institute of Industrial Property (INPI) for FR1859175 dated Jun. 14, 2019.

Kokkinos, I., "UberNet: Training a 'Universal Convolutional Neural Network for Low-, Mid-, and High-Level Vision using Diverse Datasets and Limited Memory", arxiv.org, Cornell University Library, 201 Olin Library Cornell University Ithaca, NY 14853, Sep. 7, 2016, XP080725010. pp. 1-12.

* cited by examiner

| Type | Filters | Size/Stride | Output |
|---|---|---|---|
| Convolutional | 32 | 3 × 3 | 224 × 224 |
| Maxpool | | 2 × 2/2 | 112 × 112 |
| Convolutional | 64 | 3 × 3 | 112 × 112 |
| Maxpool | | 2 × 2/2 | 56 × 56 |
| Convolutional | 128 | 3 × 3 | 56 × 56 |
| Convolutional | 64 | 1 × 1 | 56 × 56 |
| Convolutional | 128 | 3 × 3 | 56 × 56 |
| Maxpool | | 2 × 2/2 | 28 × 28 |
| Convolutional | 256 | 3 × 3 | 28 × 28 |
| Convolutional | 128 | 1 × 1 | 28 × 28 |
| Convolutional | 256 | 3 × 3 | 28 × 28 |
| Maxpool | | 2 × 2/2 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Maxpool | | 2 × 2/2 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 1000 | 1 × 1 | 7 × 7 |
| Avgpool | | Global | 1000 |
| Softmax | | | |

FIG. 2

PRIOR ART

PARAMETER TRAINING METHOD FOR A CONVOLUTIONAL NEURAL NETWORK AND METHOD FOR DETECTING ITEMS OF INTEREST VISIBLE IN AN IMAGE

CROSS-REFERENCE TO RELATED APPLICATIONS

This application claims the benefit of French Patent Application No. 1859175 filed Oct. 3, 2018, the disclosure of which is herein incorporated by reference in its entirety.

GENERAL TECHNICAL FIELD

The present invention relates to the field of supervised training, and in particular a parameter training method for a convolutional neural network and a method for detecting items of interest visible in an image by means of a convolutional neural network.

STATE OF THE ART

Neural networks are massively used for data classification.

During an automatic training phase (generally supervised, meaning on an already classified reference database), a neural network "learns" and becomes capable on its own of applying the same classification to unknown data.

Convolutional neural networks (CNN) are a type of neural network in which the connection pattern between neurons is inspired by the visual cortex of animals. They are thus particularly suited to a specific type of task, which is image analysis; indeed they allow efficient recognition of items of interest such as people or objects in images, in particular in security applications (automatic surveillance, threat detection, etc.). To achieve this, the CNN is trained based on training images, i.e. images in which items of interest have already been "annotated", meaning that they have been highlighted and tagged with the corresponding item category.

A particularly known use of CNNs is to carry out what is called object "detection", i.e. locating objects of interest within an image (such as a pedestrian, face, or vehicle) particularly through a bounded box. A second use is "tracking", i.e. the monitoring of those items of interest, such as persons or objects, over time.

Today, these techniques are satisfactory but can still be improved. Indeed, for security applications, it would be desirable, for instance, to be able to simultaneously detect persons, their faces, and vehicles using a single CNN detector. Currently, this is not possible for the following two reasons:

CNN algorithms rely on training databases that must be fully annotated (which is called supervised training) and it is generally difficult or extremely expensive to have just one database that contains all annotations. Likewise, it is not possible to merge two training databases because they are "partially" annotated with respect to one another. For instance, in the example of a database of people and a database of vehicles, the vehicles are not annotated in the database of people and vice versa, which constitutes false negatives that would completely disrupt the training. The missing annotations would need to be added manually, which is a huge task. One example is the MS-COCO database (the most commonly used) which contains only annotations of people, some animals, and some objects, but no annotations of faces. Another example is the WIDER database that contains annotations of faces only.

The state of the art in terms of object detection suggests that if one of a first and a second category of items of interest that one wants to detect is a subset of the other (such as a person and their face), even by creating an ad hoc database, it would not be possible to simultaneously train a CNN to detect both categories by means of their inclusion. Indeed, because the overlapping portion is in a "conflict" between the two categories. This is in particular linked to a principal cost function used for training, namely the "softmax cross entropy" function, which is not capable of managing categories that are not mutually exclusive.

Currently, the only solution is to generate multiple "detectors", i.e. to teach multiple CNNs on a different training database for each one (for instance, one for people, one for faces, and one for vehicles), then to analyze each image with all of the CNNs so as to detect all of the desired item categories. This complicates the method and may cause problems if there is a conflict between the detections. Additionally, if a constant detection quality for a given processing time is desired, this would require additional computing resources (processor, graphics card, memory) since several CNNs would be launched rather than a single CNN.

Consequently, it would be desirable to have a new solution for training a convolutional neural network that can be "multi-category" while remaining simple and reliable.

BRIEF DESCRIPTION OF THE INVENTION

According to a first aspect, the present invention relates to a parameter training method for a convolutional neural network, CNN, for detecting items of interest visible in an image or multiple images, the method comprising the implementation by data processing means of at least one server, for detecting items of interest visible in images, the method being characterized in that it is implemented based on a plurality of training image databases wherein said items of interest are already annotated, the CNN being a CNN common to said plurality of training image databases and having a common core and a plurality of encoding layers, each one specific to one of said plurality of training image databases.

According to other advantageous and nonlimiting characteristics:
- the method comprises the use of a plurality of cost functions, each one specific to one of said plurality of training image databases;
- the method comprises the iterative random drawing of training images from the plurality of databases, and for each training image drawn, and the calculation of a training error based on cost functions specific to the database from which said training image was drawn;
- the method further comprises, for a set of said training images randomly drawn from the plurality of databases, the sum of the training errors calculated for each of the training images of said set, and the updating of the CNN's parameters based on said sum;
- said common core of the CNN comprises all of the layers that have variable parameters other than the encoding layers;
- each encoding layer is a convolutional layer or a fully connected layer, generating a representation vector of the items of interest detected;

each training image database is associated with a set of categories of items of interest, the items of interest annotated in the images of a database being those which have a category of said set associated with the database, said sets of categories being different from one database to another;

said plurality of training image databases comprises at least one first database, one second database, and one third database, the set of categories of items of interest associated with the first database comprising the category of people, the set of categories of items of interest associated with the second database comprising the category of faces, and the set of categories of items of interest associated with the third-base comprising the category of vehicles, or at least one subset of the category of vehicles;

at least one training image database has training images in which geometric structures characteristic of items of interest are also annotated, the encoding layer specific to that training image database generating a representation vector of detected items of interest comprising, for at least one given category of items of interest to be detected, at least one value descriptive of at least one geometric structure characteristic of said category of items of interest;

said representation vector comprises two position values and one visibility value of the at least one geometric structure characteristic of said given category of items of interest;

said representation vector comprises descriptive values of at least three geometric structures characteristic of said category of items of interest.

According to a second aspect, the invention relates to a method for detecting items of interest visible in an image, by data processing means of a device, using a CNN trained via the method according to the first aspect.

According to other advantageous and nonlimiting characteristics:

the method further comprises the detection, for each item of interest of a first detected category, of geometric structures characteristic of said first category of items of interest, visible in said image;

the method further comprises the detection of items of interest of a second category different from the first category, such that the second category is a subset of the first category, and such that the geometric structures characteristic of the first category of items of interest are also geometric structures characteristic of the second category of items of interest;

either the second category is the category of faces and the first category is the category of people, or the second category is the category of license plates and the first category is the category of vehicles or a subset of the category of vehicles.

According to a third and fourth aspect, the invention proposes a computer program product comprising code instructions for the execution of a method according to the first or second aspect of parameter training for a convolutional neural network, CNN, or for detecting items of interest visible in an image; and a storage means readable by computer equipment in which a computer program product comprises code instructions for execution of a method according to the first or second parameter training aspect of the convolutional neural network, CNN, or for detecting items of interest visible in an image.

DESCRIPTION OF THE FIGURES

Other characteristics and advantages of the present invention will appear upon reading the following description of a preferred embodiment. This description will be given with reference to the attached drawings in which:

FIG. 2 depicts one example architecture on which a CNN is based for implementing an embodiment of a method for detection according to the invention;

DETAILED DESCRIPTION

Concepts

Figure 1:
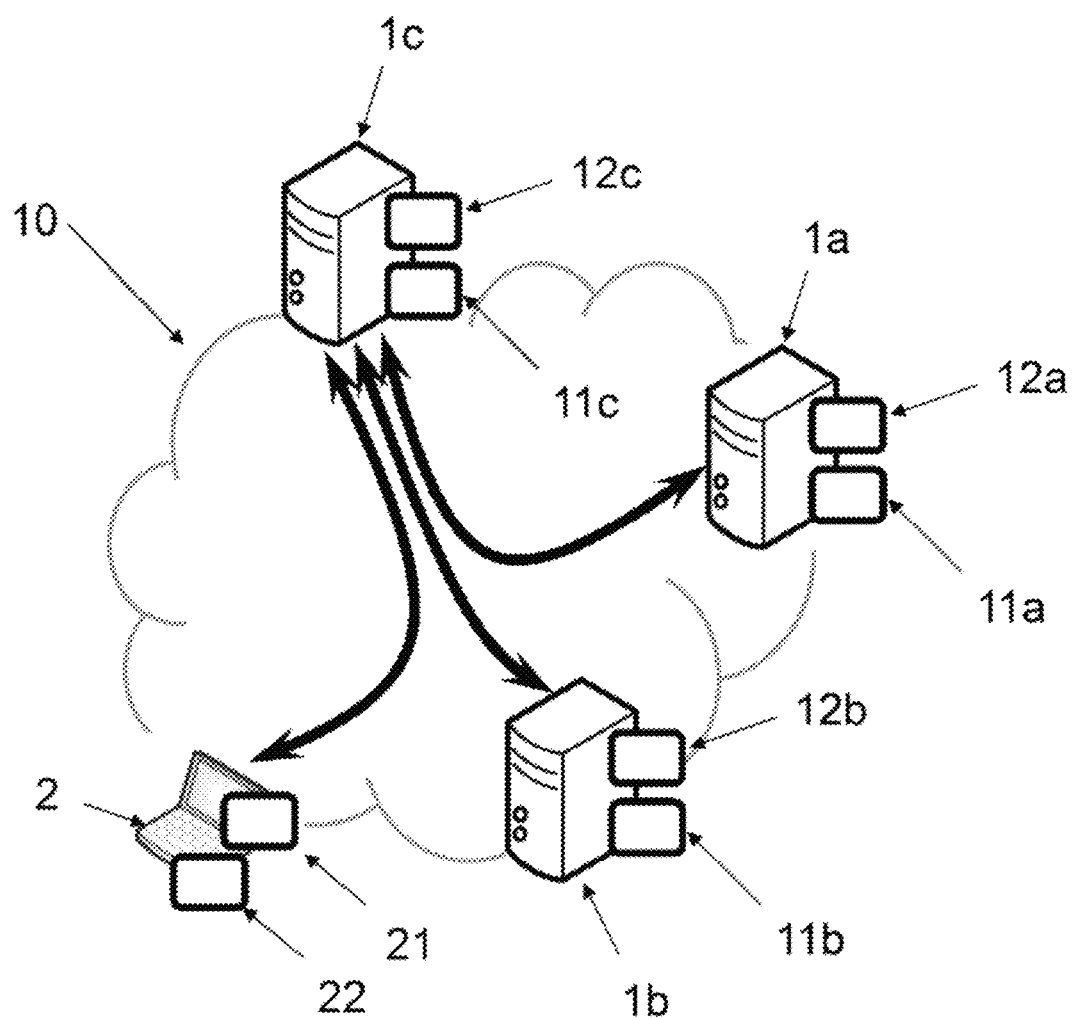
FIG. 1 is a diagram of an architecture for implementation of the methods according to the invention.

According to multiple complementary aspects, the present invention may involve:

a training method for a convolutional neural network (CNN);

a method for detecting items of interest visible in an image;

a method for associating items of interest visible in an image;

a method for tracking items of interest visible in a video made from a sequence of K images (i.e. frames).

Here, the term "item of interest" refers to any representation in the image/video of an entity for which the detection/association/tracking is desired in an image/video. Each item of interest is from a given category, corresponding to a type in the semantic sense. For instance, the categories of people, faces, vehicles, license plates, etc. may be considered: The category of vehicles covers all vehicles (car, truck, bus, etc.) regardless of the model, color, etc.; the category of license plates covers all plates regardless of the country/region that issued them, their color, etc.

"Detection" or "recognition" is the most basic operation, and refers to the simple marking of an item of interest of a known category within an image. Detection therefore combines location (determining the position and size of a box surrounding the item of interest, called the detection box) and classification (determining its category).

"Tracking" refers, as explained above, to the monitoring of those items of interest for the duration of the video, i.e. the continuous identification of the same item detected from image to image wherever it is present, so as to determine the movement of the corresponding entity over time.

To achieve this, each item of interest is referenced with an identifier, and all of the occurrences of an item of interest for a given identifier are collectively known as a "track".

A distinction shall be made between "detection" and "identification": whereas detection is carried out image by image, and makes no distinction between different items in the same category, identification assigns the detections the correct identifiers, so that two detections of the same entity in two different images will have the same identifier, i.e. be part of the same track. For instance, assuming that two items in the category of people are identified as "person 1" and "person 2", and that in a second image two items in the category of people are detected again, identification makes it possible to determine in the second image which one is person 1/2 (or even a person 3).

Identification can, in other words, be seen as matching a detected item with an entity, i.e. distinguishing between different items in the same category that are can be detected in one or more images.

The term "association" refers to the matching of two items of interest that are in different categories but are related.

A first item of interest from a first category and a second item of interest from a second category may be associated if they have a relationship, particularly if they are part of the same entity. In general, two associated items of interest from different categories are referenced by the same identifier, i.e. there is only one identifier per entity.

The remainder of the description will examine the preferred embodiment of an association whose nature is "subset". In other words, one of the first and the second category of an item of interest is a subset of the other, i.e. is part of it. Arbitrarily, this description considers the second category to be a subset of the first category, but the reverse may naturally be considered. In one example, the second category is the category of faces, and the first category is the category of people. In another example, the second category is the category of license plates, and the first category is the category of vehicles.

It should be noted that the invention will not be limited to an association in the form of subsets, and one may for instance consider an association of two categories that are themselves subsets of a third category (such as a face-hand association).

It is even possible to consider cases of associations where there is no part/subset relationship, either directly or indirectly, such as person and luggage.

In the event that there are more than two categories of items of interest that may be associated (such as person/face/hand), in particular a first category, a second category, and a third category, one may simply define a main category (the "part") and secondary categories (the "subsets"), and associate each secondary category with the primary category. For instance, if there is a person/face/hand, each hand will be associated with a person and each face will be associated with a person, but no attempt will be made to associate hands and faces (as this association is transitively known from the other two).

The present methods are implemented within an architecture such as shown by FIG. 1, thanks to one or more servers 1a, 1b, 1c, and a terminal 2. As shall be seen, the method may comprise the training of one or more convolutional neural networks, CNN, and if applicable, the servers 1a, 1b, 1c are associated training devices. The terminal 2, meanwhile, is a user device in the strict sense, meaning that it implements all or some of the present method, such as a video surveillance data processing device.

In any case, each device 1a, 1b, 1c, 2 is typically remote computer equipment connected to an extended network 10 such as the Internet for the exchange of data. Each comprises data processing means 11a, 11b, 11c, 21 of processor type and data storage means 12a, 12b, 12c, 22 such as computer memory, for example a disk.

At least one of the potential servers 1a, 1b, 1c stores a training database, i.e. a set of training images, meaning images in which items of interest have already been annotated with the corresponding category of item (as opposed to the so-called input image/video on which one is seeking to perform detection). Currently, there are at least two, or at least three, training image databases, stored on just as many different servers (the example in FIG. 1 is two servers, 1a and 1b).

In FIG. 1, the server 1c is an optional server that does not have a training image database, and which implements the obtaining of the CNNs from the databases of the servers 1a, 1b. The role of that server 1c may, however, be totally fulfilled by either of the servers 1a, 1b.

CNN

A CNN generally comprises four types of layers successively processing information:
 the convolution layer which processes blocks from the input one after the other;
 the nonlinear layer with which to add nonlinearity to the network and therefore to have much more complex decision functions;
 the pooling layer with which to combine several neurons into a single neuron;
 The fully connected layer which connects all the neurons from one layer to all the neurons of the preceding layer.

The non-linear layer NL activation function is typically the ReLU function (Rectified Linear Unit) which is equal to $f(x)=\max(0, x)$ and the most used pooling layer (labeled POOL) is the function MaxPool2$^x$2 which corresponds to a maximum among the four values of a square (four values are pooled into only one).

The convolution layer, labeled CONV, and the fully connected layer, labeled FC, generally correspond to a scalar product between the neurons of the preceding layer and the weights from the CNN.

Typical CNN architectures stack several pairs of CONV NL layers and then add a POOL layer and repeat this plan [(CONV NL)$^p$→POOL] until getting a sufficiently small size output factor, and then ending in one or two fully connected FC layers.

In image analysis, there are not always non-linear layers NL nor even fully connected layers FC.

The person skilled in the art may, for instance, refer to the CNNs described in the documents *YOLO9000: Better, Faster, Stronger*—Joseph Redmon, Ali Farhadi, arvix.org/abs/1612.08242, *Faster R-CNN: Towards Real-Time Object Detection with Region Proposal Networks*, arvix.org/abs/1506.01497, or derivatives thereof.

In the remainder of this description, we shall particularly look at an example CNN based on the architecture "Darknet-19" depicted in FIG. 2 and described in the document *YOLO9000*, which comprises 19 convolutional layers CONV, 5 pooling layers MaxPool2×2 (alternatively, one may also cite the version "Darknet-53", with 53 convolutional layers CONV, or any architecture of the type VGG, RESNET, DENSNET, etc.).

Taking the example of Darknet-19, one may construct a detection CNN by taking its common core (i.e. the part that extends to the double horizontal line in FIG. 2), and potentially adding three convolutional layers having 1024 filters each 3×3 in size, and importantly a last convolutional layer CONV that advantageously has filters that are 1×1 in size, which acts as a so-called "encoding" layer and has a size output C (i.e. has a number of filters equal to the desired size of the representation vector as an output, or even greater). Alternatively, a fully connected layer FC may be used as an encoding layer.

Indeed, the purpose of a CNN-based method is to reproducibly describe as accurately as possible the contents of an image in the form of a vector containing all information of the items to be detected, which is what an encoding layer enables. Thus, the encoding layer generates a representation vector of the detected items of interest.

The image is broken down spatially into S cells (for instance, 7×7 cells), each cell has B 'description boxes'

(typically, B=2 or 3), which indicate the presence of one or more items of interest (up to B items) in that cell, thereby constituting "candidate" detection boxes. The correct detection box is the one that best (i.e. most closely) encompasses the corresponding item of interest.

The presence of an entity within a description box is reflected at least by the data of its position within the cell and its category, encoded in the form of a "representation" vector of C values generated by the encoding layer. Generally, the vector comprises at least five values:

The x/y coordinates of the center of the description box (as a fraction of the cell's size);
The width/height w/h of the box (as a fraction of the cell's size);
An identifier c of the category of the item of interest The total description code of an image is the concatenation of all representation vectors of the description boxes, i.e. length equal to S*B*C.

Figure 4:
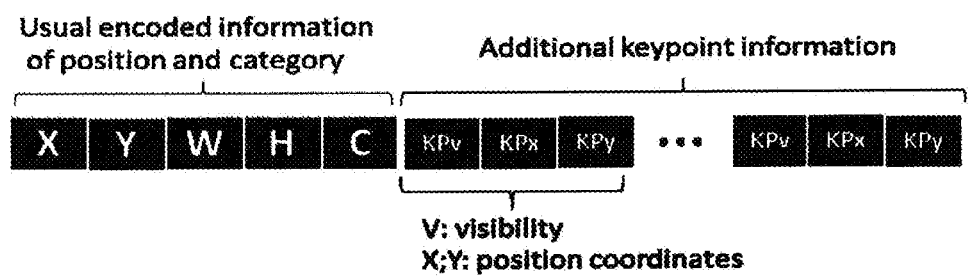
FIG. 4 depicts an example representation vector generated during the implementation of an association method according to one preferred embodiment of the invention.

Preferably, with reference to FIG. 4, at least some of the representation vectors (those for an item of interest in a given category, for example people) are elongated, i.e. they are concatenated with values descriptive of at least one geometric structure characteristic of said category, in particular said descriptive values advantageously comprise at least two position values (coordinates KPx/KPy) and/or a visibility value (Boolean value KPv). Particularly preferably, there are at least three characteristic geometric structures, meaning at least nine additional descriptive values, as we shall see later on.

Thus, the detection of the characteristic geometric structures may be performed simultaneously with the detection of items of interest, without any additional time and without harming performance.

"Characteristic geometric structure" particularly refers to a keypoint, but may also be a shape such as a polygon, a mesh, etc. and generally speaking any graphical object easily detectable in all items of that category. Particularly preferably, when either the first category or the second category is a subset of the other, characteristic geometric structures are chosen that are common to both the first category and the second category. In the face/person example, one may, for instance, choose the two eyes and the nose, as these are geometric structures with a very particular shape, which are characteristics of both a person and a face.

The use of these "common" characteristic geometric structures very cleverly makes it possible to associate items from two categories within the image in a very reliable fashion, as we shall see later on.

In the remainder of the description, we shall take the example in which said geometric structures are points, and for instance, the eyes or nose of a face will be annotated as points.

Advantageously, one may encode other information about this code into the representation vector (other bounding boxes, information about the current action, a license plate number of a vehicle, etc.).

Training Method

According to a first aspect, the invention relates to a parameter training method of at least one convolutional neural network, CNN, for detecting items visible in images, based on a plurality of training image databases in which said items are already annotated, i.e. located and classified (the category is determined). Each image database is advantageously associated with a set of categories of items of interest, the items of interest annotated in the images of a database being those belonging to a category of said set of categories associated with the database. It is particularly sought to detect items of interest from at least two categories, including a first category and a second category. It is easy to understand that the present CNN performs only a single task, namely detecting items of interest, but does so in all categories of items of interest associated with either one of the training image databases, i.e. the training method only increases the detection spectrum despite the absence of any "comprehensive" training database. This is meant to contrast with so-called multi-task CNNs (see the document Iasonas Kokkinos, *UberNet: Training a 'Universal' Convolutional Neural Network for Low-, Mid-, and High-Level Vision using Diverse Datasets and Limited Memory*) which are capable of simultaneously carrying out multiple independent tasks on the same input image, such as detection and segmentation.

As explained earlier, items from at least one given category may already be annotated with one or more characteristic geometric structures, i.e. their known coordinates in the image. It is understood that the characteristic geometric structures are not always visible and therefore are only entered if they are visible. For instance, a person in profile may be detected as an item from the category of people (and so may their face), but their left or right eye will not be visible because it is behind their head.

This method cleverly gets around the problem of incompatibility between different databases and makes it possible to have a common CNN that learns directly from a plurality of training image databases, in a single step of training. This is advantageously performed by data processing means 11c of the server 1c connected to the other servers 1a, 1b of the databases. Said CNN is said to be "common" to multiple databases (in other words, there is only one CNN that learns from several databases at once), as opposed to known CNNs that could only learn from one database each (there was then a need for as many CNNs as databases).

Figure 3:
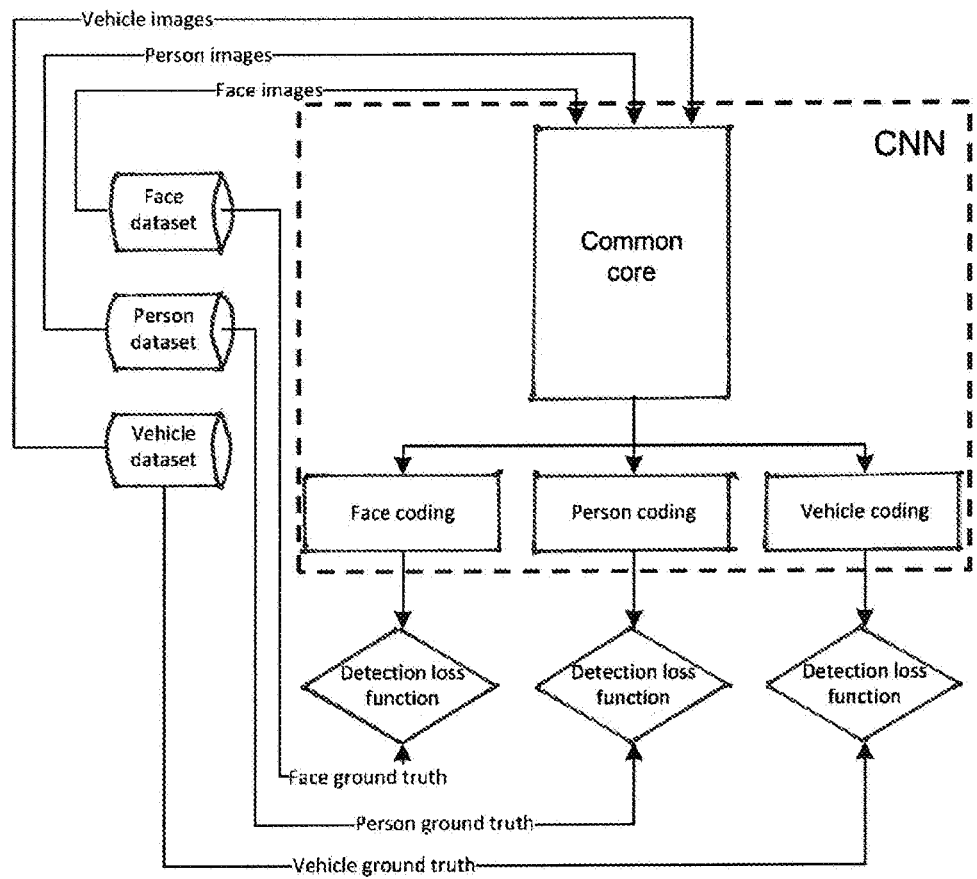
FIG. 3 schematically depicts the implementation of a training method according to one preferred embodiment of the invention.

With reference to FIG. 3, said plurality of training image databases advantageously comprises at least one first training image database (in which at least the items of interest from the first category are already annotated) and a second database (in which at least the items of interest from the second category are already annotated), or even a third database (in which at least the items of interest from a category other than the first and second categories are already annotated).

Preferably, one of the first and the second category (arbitrarily, the second) is a subset of the other, so as to enable detection of items embedded in one another, which as explained was not possible until now, because the common part was in a "conflict" between the two categories. Indeed the present method learns simultaneously from two different databases, each one separately and without any possibility of overlap annotating only one of the two categories, and is therefore no longer affected by the problem of interference of items between those two categories of which one is part of the other.

For instance, the set of categories of items of interest associated with the first database comprises the category of people (the first category, in the examples), the set of categories of items of interest associated with the second database comprises the category of faces (the second category), and the set of categories of items of interest associated with the third database comprises one or more categories of inanimate objects, such as the category of vehicles or at least one subcategory of vehicles (for instance, the seven categories of cars, trucks, buses, motorcycles, bicycles, aircraft, and boats). However, it is understood that the invention is not limited to any choice of databases/categories.

For this, the common CNN used is a CNN that has a common core and a plurality of encoding layers, each one specific to one of said plurality of training image databases.

In other words, as we shall see in FIG. 3, the CNN's architecture does not have an encoding layer shared by all of the embodiments (i.e. the various sets of categories), but rather one encoding layer specific to some of the embodiments.

Particularly preferably, said common core comprises all layers that have variable parameters other than the encoding layer, and in particular start the start. In the example in FIG. 2, the common core extends to the double horizontal line.

In other words, assuming that there are three training image databases as in the example in FIG. 3, then there are three encoding layers, and for each training image taken as input, the encoding layer corresponding to the database from which the training image comes is used.

It is therefore understood that all of the training images are involved in training the common core, but only the images from one database are involved in training each encoding layer.

The various encoding layers are, as explained, each advantageously made up of a convolutional layer with filters preferably of size 1×1, and whose output size C (the number of filters) corresponds to the size of the representation vector (typically 8 for people and faces, and 14 for vehicles if there are 7 subcategories as in the example above, plus said values descriptive of at least one characteristic geometric structure for at least one of them). The various encoding layers are typically arranged in parallel.

Additionally, as depicted in FIG. 3, a plurality of cost functions is advantageously used, again each one being specific to one of said plurality of training image databases.

It should be noted that a cost function (or "loss") specifies how the training of the CNN penalizes the difference between the expected signal and the real one. More specifically, for a piece of input data (a training image), the cost function makes it possible to quantify an "error" between the output obtained by the CNN (the detected items) and the theoretical output (the annotated items). Training seeks to modify the CNN's parameters so as to gradually reduce the error as calculated by the cost function. One known example is the Softmax function (or normalized exponential function), or the Huber function, standards such as the L1 standard, etc.

To carry out the training itself, the standard technique called gradient backpropagation "propagates back" the calculated errors, so as to update the parameters of all the layers.

In this embodiment, this is done with different cost functions depending on the database each training image comes from. More specifically, training images are drawn randomly in an iterative fashion from the plurality of databases (i.e. each image may be taken from any database), and for each one, the weights and parameter of the CNN are varied based on the cost function corresponding to the database from which it comes.

Particularly preferably, a so-called "batch" training paradigm is implemented, meaning that for a set of training images taken indiscriminately from various databases, the errors are calculated first (with the corresponding cost function) without updating the parameters, then those various errors are added together, and when the set of images of said set has gone through the CNN once, the backpropagation is applied throughout the CNN using the total error (added together).

The common CNN may be used as a "multi-category" detector when applied to the input images. Naturally, it is already possible to create multi-category detectors from a single database if that database already has the elements from multiple annotated categories, but one is limited to those categories. The common CNN of the present invention makes it possible to combine any training databases, and therefore to be multi-category in a completely open way.

It is understood that adding more encoding layers and cost functions makes it possible, without substantially increasing network size, not to have one detection penalized by another, and to have the same efficiency as with one or more detectors. Additionally, there are significant time savings in training because it can be carried out simultaneously for all databases.

It should be noted that it is entirely possible, if it is desired to detect a large number of different categories, to train other CNNs, whether they each comply with the invention (a CNN common to multiple databases) or comply with the state of the art (a CNN specific to one database). For instance, one may have a first common multi-category detector CNN, and a second detector CNN dedicated to another category that is complex to identify, and as such trained on a particular database.

Additionally, the CNN(s) may be trained based on at least one training image database in which characteristic geometric structures are also annotated, in particular geometric structures characteristic of at least one given category (the first category).

As explained above, the CNN then comprises an encoding layer for generating a representation vector of the items of interest to be detected, comprising for at least said first category of items of interest to be detected, at least one (advantageously three, in particular coordinates and visibility) value descriptive of at least one (advantageously three) characteristic geometric structures (in particular keypoints) of said first category of items of interest. Again, it is understood that not all of the characteristic geometric structures are necessarily visible, and that naturally only those which can be detected. Thus, even if an attempt is made to detect three keypoints, not all three necessarily will be detected (but it will be indicated in such a case which is/are not visible).

Detection

According to a second aspect, the invention proposes a method for detecting items of interest visible in an image (an input image, as opposed to training images) by data processing means 21 of the terminal 2, using a CNN trained via the method according to the first aspect.

This detection method comprises two steps: In a first step, a CNN is trained as defined previously, and in a second step, the data processing means 21 of the terminal 2 process said image, by means of the CNN, so as to detect the item(s) of interest that are visible therein.

This method is implemented in a standard manner, and it is easy to see how, as explained, the detection can be "multi-category".

Again, other CNNs may be used as detectors of items of interest from other categories.

Association & Tracking

The present detection method may be used in a method for associating items of interest visible in an image, implemented by data processing means 21 of the terminal 2.

More specifically, the detection of at least one item of interest from a first category and at least one item of interest from a second category different from the first category both visible in said image may be implemented in accordance with the detection method according to the second aspect, then each item of interest from the first category detected in said image is associated with an item of interest from the second category detected in said image.

It should be noted that two associated items are considered related to, and in particular part of, the same entity, as explained previously.

It should also be noted that it is still possible that there may remain an "orphan" item from the first or second category if the numbers of items detected from the first and second categories are not the same, i.e. if for instance the one with which an item should have been associated is hidden, or if the detection did not work.

Each item of interest is advantageously referenced with an identifier, and preferably the association of two elements is reflected by associating the first identifier with the second (i.e. the two are referenced with the same identifier).

The association may be implemented in a standard manner (typically by detecting the inclusion of a second item within the first item), but particularly preferably, an innovative method will be used that associates items of interest within an image, as described in the application FR1859162, involving the CNN with an elongated representation vector as described above.

The inventive idea is not to directly compare the items from the first category and the items from the second category, but rather, based on the principle that the second category is a subset of the first category and that the keypoints of the first category of items of interest are also keypoints of the second category of items of interest, to directly compare the keypoints of the first category with items from the second category: the keypoints may be seen as a "second detection" of an item from the second category, which is easy to match with it.

Finally, this method of association may be used in a method for tracking items of interest visible in a video made up of a sequence of K images.

Computer Program Product

According to a third and a fourth aspects, the invention relates to a computer program product comprising code instructions for execution (in particular on data processing means 11a, 11b, 11c, 21 of one or more servers 1a, 1b, 1c or of the terminal 2) of a method according to the first aspect of the parameter training invention for a CNN or a method according to the second aspect of the invention for detecting items of interest visible in an image; and also storage means readable by computer equipment (a memory 12a, 12b, 12c, 22 of of one or more servers 1a, 1b, 1c or of the terminal 2) on which this computer program product is located.

The invention claimed is:

1. A parameter training method for a convolutional neural network, CNN, for detecting items of interest by data processing means (11a, 11b, 11c) of at least one server (1a, 1b, 1c) from at least one first category of items of interest and one second category of items of interest visible in one or more images, the method being characterized in that it is implemented based on a plurality of training image databases wherein said items of interest are already annotated, each training image database being associated with a set of categories of items of interest, the items of interest annotated in the images of a database being those belonging to a category of said set associated with the database, said sets of categories being different from one database to another, and such that the set of categories of items of interest associated with a first database of said plurality of training image databases comprises the first category and the set of categories of items of interest associated with a second database of said plurality of training image databases comprises the second category, the CNN being a CNN common to said plurality of training image databases and having a common core and a plurality of encoding layers, each one specific to one of said plurality of training image databases.

2. The method according to claim 1, comprising the use of a plurality of cost functions, each one specific to one of said plurality of training image databases.

3. The method according to claim 1, wherein said common core of the CNN comprises all of the layers that have variable parameters other than the encoding layers.

4. The method according to claim 1, wherein each encoding layer is a convolutional layer or a fully connected layer, generating a representation vector of the items of interest detected.

5. The method according to claim 1, wherein the second category of items of interest is a subset of the first category of items of interest.

6. The method according to claim 1, at least one training image database has training images wherein geometric structures characteristic of items of interest are also annotated, the encoding layer specific to that training image database generating a representation vector of the detected items of interest comprising, for at least one given category of items of interest to be detected, at least one value descriptive of at least one geometric structure characteristic of said category of items of interest.

7. A method for detecting items of interest visible in an image by data processing means (21) of a terminal (2), using a CNN trained in compliance with the method according to claim 1.

8. The method according to claim 2, comprising the iterative random drawing of training images from the plurality of databases, and for each training image drawn, and the calculation of a training error based on cost functions specific to the database from which said training image was drawn.

9. The method according to claim 5, wherein said plurality of training image databases further comprises a third database, the set of categories of items of interest associated with the first database comprising the category of people, the set of categories of items of interest associated with the second database comprising the category of faces, and the set of categories of items of interest associated with the third-base comprising the category of vehicles, or at least one subset of the category of vehicles.

10. The method according to claim 8, further comprising, for a set of said training images randomly drawn from the plurality of databases, the sum of the training errors calculated for each of the training images of said set, and the updating of the CNN's parameters based on said sum.

11. A parameter training method for a convolutional neural network, CNN, for detecting items of interest by data processing means (11a, 11b, 11c) of at least one server (1a, 1b, 1c) from at least one first category of items of interest and one second category of items of interest visible in one or more images, the method being characterized in that it is implemented based on a plurality of training image databases wherein said items of interest are already annotated, each training image database being associated with a set of categories of items of interest, the items of interest annotated in the images of a database being those belonging to a category of said set associated with the database, said sets of categories being different from one database to another, and such that the set of categories of items of interest associated with a first database of said plurality of training image databases comprises the first category and the set of categories of items of interest associated with a second database of said plurality of training image databases comprises the second category, the CNN being a CNN common to said plurality of training image databases and having a common core and a plurality of encoding layers, each one specific to one of said plurality of training image databases;

wherein a non-transitory computer program product comprising code instructions for the execution of said method for parameter training for a convolutional neural network, CNN, or for detecting items of interest visible in an image, when said code instructions are executed by a computer.

12. A parameter training method for a convolutional neural network, CNN, for detecting items of interest by data processing means (11a, 11b, 11c) of at least one server (1a, 1b, 1c) from at least one first category of items of interest and one second category of items of interest visible in one or more images, the method being characterized in that it is implemented based on a plurality of training image databases wherein said items of interest are already annotated, each training image database being associated with a set of categories of items of interest, the items of interest annotated in the images of a database being those belonging to a category of said set associated with the database, said sets of categories being different from one database to another, and such that the set of categories of items of interest associated with a first database of said plurality of training image databases comprises the first category and the set of categories of items of interest associated with a second database of said plurality of training image databases comprises the second category, the CNN being a CNN common to said plurality of training image databases and having a common core and a plurality of encoding layers, each one specific to one of said plurality of training image databases;

wherein a non-transitory storage means readable by computer equipment on which a computer program product is stored, said computer program product comprising code instructions for the execution of said method for parameter training for a convolutional neural network, CNN, or for detecting items of interest visible in an image.

\* \* \* \* \*